June 15, 1954 H. BESSIRE 2,681,224

DEVICE FOR CHANGING THE SPEED OF RECORDING TAPE

Filed Jan. 30, 1952

INVENTOR:
HENRI BESSIRE
BY K. A. Mayr
ATTORNEY.

Patented June 15, 1954

2,681,224

UNITED STATES PATENT OFFICE 2,681,224

DEVICE FOR CHANGING THE SPEED OF RECORDING TAPE

Henri Bessire, Bienne, Switzerland, assignor to Produits Perfectone S. A., Bienne, Switzerland, a joint-stock company Application January 30, 1952, Serial No. 268,998

Claims priority, application Switzerland January 30, 1951

3 Claims. (Cl. 271—2.3)

This invention relates to magnetic sound recording and reproducing machines, and more particularly, to a device for changing the speed of the recording tape of such machines.

The width of the frequency band, reproduced by such machines, increases proportionally to the speed of the recording tape of such machines. Therefore it is possible to move the tape at a lower speed when a lower quality of the reproduction is required, whereby the playing period, that is, the time it takes to wind the recording tape from one reel of the machine to the other, may be extended. Moreover it will be understood that for many recordings the availble frequency band is very restricted so that a speed of the recording tape allowing a high quality recording would be useless. Therefore, in order to adapt the speed of the recording tape to the desired quality of the recording, or rather to the quality expected, these magnetic sound recording and reproducing machines are equipped with devices for changing the speed of the recording tape. The problem of changing the speed of the recording tape is a most difficult one, since the smallest variations in speed of the tape are heard when reproducing the recording. This is true for any toothed wheel transmission where variations in the driving speed occur due to ovalization of the gears, and vibrations are caused by the gear teeth.

In order to avoid these disadvantages it is indispensable to arrange a fly-wheel, elastically coupled, and placed between the tooth wheel transmission and the drive of the tape. This fly-wheel should be rated for all occurring speeds; it may, however, be matched to only one special speed. Owing to the different kinetic energies of the fly-wheel which is driven at different speeds for every given speed of the recording tape, the starting and stopping periods of the machine are different depending on the speed of the recording tape.

It is an object of this invention to avoid these disadvantages.

The device according to this invention for changing the speed of the recording tape of magnetic sound recording and reproducing machines is broadly characterized by a plurality of driving cylinders of different diameter, said driving cylinders being driven at a constant speed, and by means for changing the relative position of the recording tape and of said driving cylinders in order to selectively drive the recording tape by one of said driving cylinders.

Due to this arrangement any toothed wheel transmissions or friction gearings are avoided and the fly-wheel is always driven at the same speed.

Figure 1:
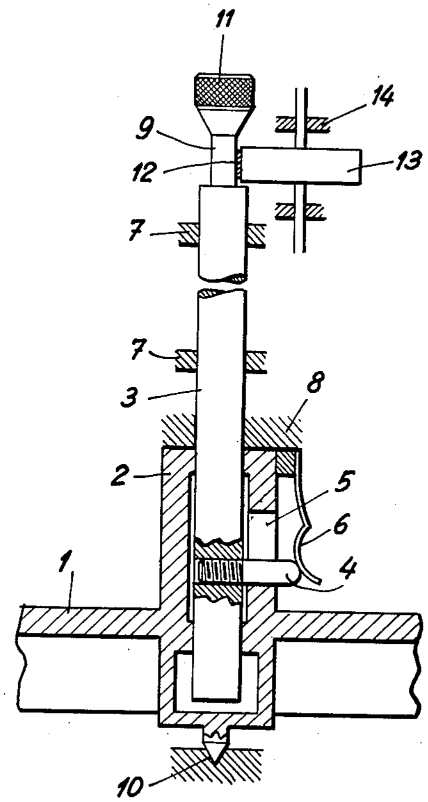
Figure 2:
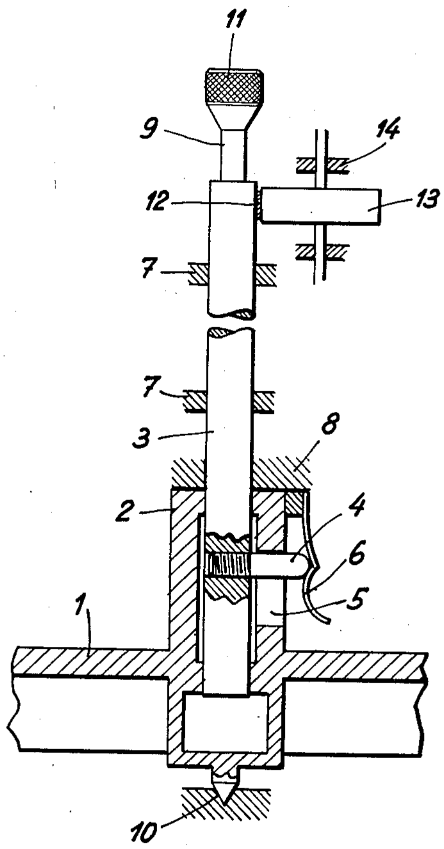

One embodiment of this invention will now be described with reference to the accompanying drawings in which Figs. 1 and 2 show the driving means of the machine in different operating positions.

The driving means consist of a fly-wheel 1 which is driven by a suitable motor and suitable transmitting means, not shown, in a conventional manner. A vertical shaft 3 is axially slidably mounted in a sleeve 2 extending from the fly-wheel 1 which is axially unmovable. A pin 4 radially extending from the lower portion of the shaft 3 projects through an axial slot 5 of the sleeve 2, the free end of the pin being held by a spring 6 which is fixed to the sleeve 2. The shaft 3 is slidably mounted in stationary bearings 7 whereas the fly-wheel is mounted between the bearings 8 and 10. The upper end of the shaft 3 is provided with a recess 9 and an actuating knob 11. The recording tape is pressed against the shaft 3 by means of a tension roller 13 mounted in bearings 14.

For changing the speed of the recording tape, the tension roller 13 is removed from the tape and the shaft 3 is shifted upwardly or downwardly by means of the actuating knob 11 according to whether the speed of the tape is to be increased or decreased. In the first case the tape is running on the full diameter of the shaft 3 as shown in Fig. 2, in the second case the tape is running in the recess 9 as shown in Fig. 1. The shaft is moved into the desired position by shifting it downwards or upwards until the pin 4 is stopped at the end of the slot 5. Thereafter the shaft 3 is held in the selected position by the spring 6. The desired speed of the recording tape may easily be chosen by simply pulling out or pushing the actuating knob during introduction of the recording tape into the machine.

Of course, the shaft 3 may be equipped with several driving cylinders of different diameter without departing from the scope of this invention, in order to afford changing to several tape speeds.

What I claim is:

1. A device for changing the speed of the recording tape of magnetic sound recording and reproducing machines, comprising a motor driven fly-wheel axially unmovably mounted between stationary bearings, a sleeve coaxially extending from said fly-wheel and rotating therewith, a shaft axially slidably mounted in said sleeve and unrotatable with respect to said sleeve, said shaft having a portion projecting from said sleeve, cylinders of different diameters connected with said portion and adapted to selectively engage the recording tape depending on the relative axial position of said shaft and of said sleeve for advancing said tape at speeds corresponding to the diameters of said cylinders, and locking means for locking said shaft in predetermined positions relatively to said sleeve.

2. A device according to claim 1 in which said locking means comprise an axial slot in said sleeve, a pin radially extending from said shaft through said slot, and a spring member connected to said sleeve and being engaged by said pin.

3. A device according to claim 1 in which said cylinders are formed by parts of different diameters of said portion of said shaft projecting from said sleeve.

References Cited in the file of this patent

UNITED STATES PATENTS

| Number | Name | Date |
|---|---|---|
| 1,882,413 | Edouart | Oct. 11, 1932 |
| 1,972,555 | Fear | Sept. 4, 1934 |
| 2,118,347 | Hardenburg | May 24, 1938 |
| 2,254,066 | Gruber et al. | Aug. 26, 1941 |